United States Patent
Ortiz et al.

(10) Patent No.: US 9,811,737 B2
(45) Date of Patent: Nov. 7, 2017

(54) METHODS AND SYSTEMS ENABLING ACCESS BY PORTABLE WIRELESS HANDHELD DEVICES TO DATA ASSOCIATED WITH PROGRAMMING RENDERING ON FLAT PANEL DISPLAYS

(71) Applicants: Luis Miguel Ortiz, Albuquerque, NM (US); Luis M. Ortiz, Albuquerque, NM (US)

(72) Inventors: Luis Miguel Ortiz, Albuquerque, NM (US); Luis M. Ortiz, Albuquerque, NM (US)

(73) Assignee: Ortiz and Associates Consulting, LLC, Albuquerque, NM (US)

( * ) Notice: Subject to any disclaimer, the term of this patent is extended or adjusted under 35 U.S.C. 154(b) by 0 days.

(21) Appl. No.: 14/976,510

(22) Filed: Dec. 21, 2015

(65) Prior Publication Data
US 2016/0182929 A1  Jun. 23, 2016

Related U.S. Application Data

(63) Continuation-in-part of application No. 14/306,895, filed on Jun. 17, 2014.
(Continued)

(51) Int. Cl.
*G06K 9/00* (2006.01)
*H04N 21/231* (2011.01)
(Continued)

(52) U.S. Cl.
CPC ... *G06K 9/00758* (2013.01); *H04N 21/23106* (2013.01); *H04N 21/4126* (2013.01);
(Continued)

(58) Field of Classification Search
CPC .... H04N 7/163; H04N 21/4532; H04N 7/165; H04N 21/4623; H04N 21/84;
(Continued)

(56) References Cited

U.S. PATENT DOCUMENTS

| 8,320,820 B2 | 11/2012 | Ortiz | |
|---|---|---|---|
| 2002/0138641 A1* | 9/2002 | Taylor | H04L 29/06027 709/231 |

(Continued)

*Primary Examiner* — Chenea Smith (57) ABSTRACT

Flat panel displays can broadcast their identity for discovery by handheld devices interested in obtaining data associated with video programming displayed on the displays. An application can be downloaded and activated on smartphones that will enable them to capture an image of the video programming and recognize is with the help of a remote server, or wirelessly obtain a list of available (discovered) flat panel displays (multiple screens, depending on venue) that allow wireless access to data associated with video programming displayed (or previously displayed and stored in a queue) on flat panels. Video programming rendering on a flat panel of interest can be identified via the smartphone and the smartphone can access additional data either directly from the flat panel or from a remote server once the data has been identified and/or engage in an interactive session in association with the displayed programming or data.

5 Claims, 6 Drawing Sheets

Related U.S. Application Data (60) Provisional application No. 61/842,544, filed on Jul. 3, 2013.

(51) Int. Cl.

| | | |
|---|---|---|
| *H04N 21/41* | (2011.01) | |
| *H04N 21/414* | (2011.01) | |
| *H04N 21/426* | (2011.01) | |
| *H04N 21/433* | (2011.01) | |
| *H04N 21/4363* | (2011.01) | |
| *H04N 21/4722* | (2011.01) | |
| *H04N 21/81* | (2011.01) | |

(52) U.S. Cl.
CPC . *H04N 21/41415* (2013.01); *H04N 21/42684* (2013.01); *H04N 21/4331* (2013.01); *H04N 21/43637* (2013.01); *H04N 21/4722* (2013.01); *H04N 21/8133* (2013.01)

(58) Field of Classification Search
CPC ........... H04N 21/2541; H04N 21/4627; H04N 21/44008; H04N 21/23106; H04N 21/8133; H04N 21/41415; H04N 21/42684; H04N 21/4331; H04N 21/43637; H04N 21/4722; H04N 21/4126; G06K 9/00758
See application file for complete search history.

(56) References Cited

U.S. PATENT DOCUMENTS

| | | | |
|---|---|---|---|
| 2011/0138416 A1* | 6/2011 | Kang | G06F 3/0482 725/39 |
| 2011/0296484 A1* | 12/2011 | Harres | H04H 20/57 725/114 |
| 2012/0033876 A1* | 2/2012 | Momeyer | G06F 17/30781 382/165 |
| 2012/0174167 A1* | 7/2012 | Walters | H04N 21/6581 725/89 |
| 2013/0079004 A1* | 3/2013 | Singhal | H04W 4/02 455/435.1 |
| 2013/0102242 A1 | 4/2013 | Anzures et al. | |
| 2013/0152139 A1 | 6/2013 | Davis et al. | |
| 2013/0170813 A1 | 7/2013 | Woods et al. | |
| 2013/0326570 A1* | 12/2013 | Cowper | H04N 21/4725 725/109 |
| 2014/0237082 A1* | 8/2014 | Chen | H04W 4/18 709/219 |
| 2015/0341694 A1* | 11/2015 | Hanko | H04N 21/435 725/32 |

\* cited by examiner

METHODS AND SYSTEMS ENABLING ACCESS BY PORTABLE WIRELESS HANDHELD DEVICES TO DATA ASSOCIATED WITH PROGRAMMING RENDERING ON FLAT PANEL DISPLAYS

INVENTION PRIORITY

This application claims priority under 35 U.S.C. §119(e) as a Continuation-in-Part application of U.S. patent application Ser. No. 14/306,895, entitled "Methods and Systems Enabling Access by Portable Wireless Handheld Devices to Data Associated with Programming Rendering on Flat Panel Displays," which was filed on Jun. 17, 2014, which claims the benefit of U.S. Provisional Patent Application Ser. No. 61/842,544, entitled "Methods and Systems Enabling Access by Portable Wireless Handheld Devices to Data Associated with Programming Rendering on Flat Panel Displays," which was filed on Jul. 3, 2013, the disclosures of which are incorporated herein by reference in their entirety.

FIELD OF THE INVENTION

The present invention is generally related to wireless handheld devices such as smartphones and also to flat panel displays such as smart TVs. The present invention is also related to the exchange of data between devices. More particularly, the present invention is related to methods and systems enabling access to data associated with video programming rendering on flat panel displays by portable wireless handheld devices located near the flat panel displays and having access to a remote server.

BACKGROUND

Television sets today can be connected to data networks (e.g., the Internet) and are being marketed as "Smart TVs" because of their data network accessing capabilities, as well as the smartphone-like user interfaces they provide. Smart televisions and smartphones have only recently been able to interact with what is being referred to as "second screen" applications: however, applications that are currently available are limited to the wireless rendering of data that is either provided from a smartphone onto the screen of a flat panel display utilizing small gateway and video streaming devices such those provided by Apple (e.g., Apple TV's Airplay) and Roku or where data associated with programming displayed on the flat panel display is accessed from a remote server (i.e., website) only after identifying a program being watched on a large flat panel display to the server by name or access code. Media sharing to flat panels directly from handhelds to flat panels has also been enabled using other wireless means or standards such as DLNA via a router, and directly with flat panel devices using VOA direct, which has recently been accomplished with applications such as Multiscreen Play (by Hisense), AllJoyn and Snapdragon (by Qualcomm), Content Share (by Haier), Miracast (by Panasonic), SmartShare (by LG), and others. Yet all of these applications are only described for use in sharing data in one direction—from handheld devices to larger flat panel devices.

As of the priority filing date of this invention, a flat panel display (Smart TV) is not known to provide data directly to smartphones following a request initiated at the smartphone. All current data delivery appears limited to what is provided from a handheld device (smartphone) to a large data network-enabled flat panel display (Smart TV), typically by utilizing the screen/data sharing technologies describe above. All current data exchange solutions are also limited to interaction between two devices, a smartphone and a flat panel display/smart TV that are already connected to each other and are wirelessly engaged to provide commands and data from the handheld device to the flat panel display or a smartphone and a remote server based on information obtained about a program being displayed on a flat panel display. There is currently no intermediary device or application that can identify information that is available for smartphone retrieval based on what is being displayed on flat panel displays.

An interesting data access problem presents itself in a scenario where there are several screens displaying multimedia data to spectators located in a public venue (e.g., a sports bar, sports stadium, casino sports book, etc.) rather than a private den or office. No solutions are currently available for spectators utilizing wireless handheld devices to access/select data associated with (or being rendered on) a screen chosen from several screens co-located at the venue whereon various multimedia content is also being displayed. The present inventors believe that spectators/observers at a public venue would like the ability to access specific content being displayed on and/or otherwise interact with what is being displayed on any of the multiple screens. This is especially true with respect to sports programming where fans often desire to access data associated with programming that will enable them to see a video replay or review statistics.

SUMMARY

It is therefore a feature of the embodiments to enable smartphone device users to select/identify video programming rendering on a flat panel device to access data associated with the video programming (data rendered currently or in the brief past) or engage in an interactive session associated with the data rendered on a selected flat panel device.

It is another feature to enable portable handheld device users to use the portable handheld device (e.g., smartphone, tablet) operating as a second screen to access data from a remote server based on a match of an image captured by the handheld device camera of video programming being displayed on a flat panel television display operating as a primary screen with images of video programming stored in a remote server.

It is yet another feature for the a media module to be associated with the handheld device to enable capturing of an image of a live broadcast of video programming being displayed on a display screen utilizing a camera integrated in the handheld device, matching of the image captured by the camera with images of video programming stored in a remote server, and provide access to data associated with the video programming based on the match.

It is another feature of the present invention to enable flat panel devices to broadcast their identity via wireless communications (e.g., Bluetooth, or WiFi direct) to handheld devices utilizing an application that enables flat panel discovery and supports interaction with flat panels that are discovered and chosen by the handheld devices.

It is another feature of the present invention to enable portable handheld devices to wirelessly identify video programming being displayed on a flat panel display, select, and obtain data/associated information from a remote server or the flat panel display, or a set top box or other hardware connectable to the flat panel display.

It is another feature of the present invention that operational features of the portable handheld device can be enabled with an Application (App) that can be downloaded from a remote server.

What is needed is a way to easily select a large screen from among several co-located screens and access the content being displayed on the large screen in the venue so that users can view the data on their personal handheld devices as well as engage in an interactive session either directly with the large screen or in association with the data displayed on the large screen. The present inventors believe it would also be desirable to access data that has already been displayed and is now consider past rendering by providing a data queue that can store the data or a server providing the data, or identification information from a flat panel display (e.g., video programming rendering thereon) needed to retrieve the past video data, after the data has already been rendered on a large screen. With another feature of the present invention, past video data can be retrieved from a remote server over a data network based on the identification information, or directly from large screen with on-board memory (e.g., in a flat panel display, set top box or HDMI pluggable hardware module) capable of storing a limited amount of multimedia data previously displayed on the large screen.

In accordance with features of the preset invention, flat panel displays can be enabled to wirelessly broadcast their identity for discovery and can also identify data associated with the content being displayed to multiple users of handheld devices (e.g., smartphones). This capability can be referred to as mediacasting, or Mediacast-enabled with respect to aspects of the mediacasting capability directly incorporated into flat panel devices or accessible as a program on a handheld device. Data can include video, text, audio, and identifying information needed to access such data from a remote server. Handheld device users can activate an application on their smartphones that will enable them to either see a list of available (discover) flat panel displays (often multiple screens, depending on venue) that allow wireless access by handheld devices to data being displayed (or previously displayed and stored in a queue) on the flat panel displays, or use an image captured of the video programming rendering on a select flat panel display to finding matching video programming at a remote server and access data associated with the video programming. The smartphone users can select a screen of interest (or data for the screen of interest) and access additional data (either directly from the flat panel or from a remote server once the data has been identified) based on the identified video programming and/or engage in an interactive session in association with the displayed data.

In accordance with additional features of the present invention, possible venues that can deploy the mediacasting concept disclosed herein are: sports bars, sports venues, educational institutions, casino sports hooks, shopping centers, amusement parks, lobbies, public and private location, and the like.

In accordance with yet another feature of the present invention, an application ("APP") that enables smartphones to access data associated with recognized video programming rendering on a flat panel to obtain additional data, and/or interact with Mediacast-enabled flat panels can be downloaded from a server associated with application providers (e.g., Apple, Google Android, etc.).

Wireless standards that can be used to implement the invention include Bluetooth Wifi, WiFi direct, and cellular data (e.g. LTE/4G+).

Smartphones, Tablets and laptops including a camera and wireless data communication capabilities integrated therein are just some of the handheld device that could also be used to access data under the teaching described herein.

DETAILED DESCRIPTION OF THE INVENTION

Figure 1:
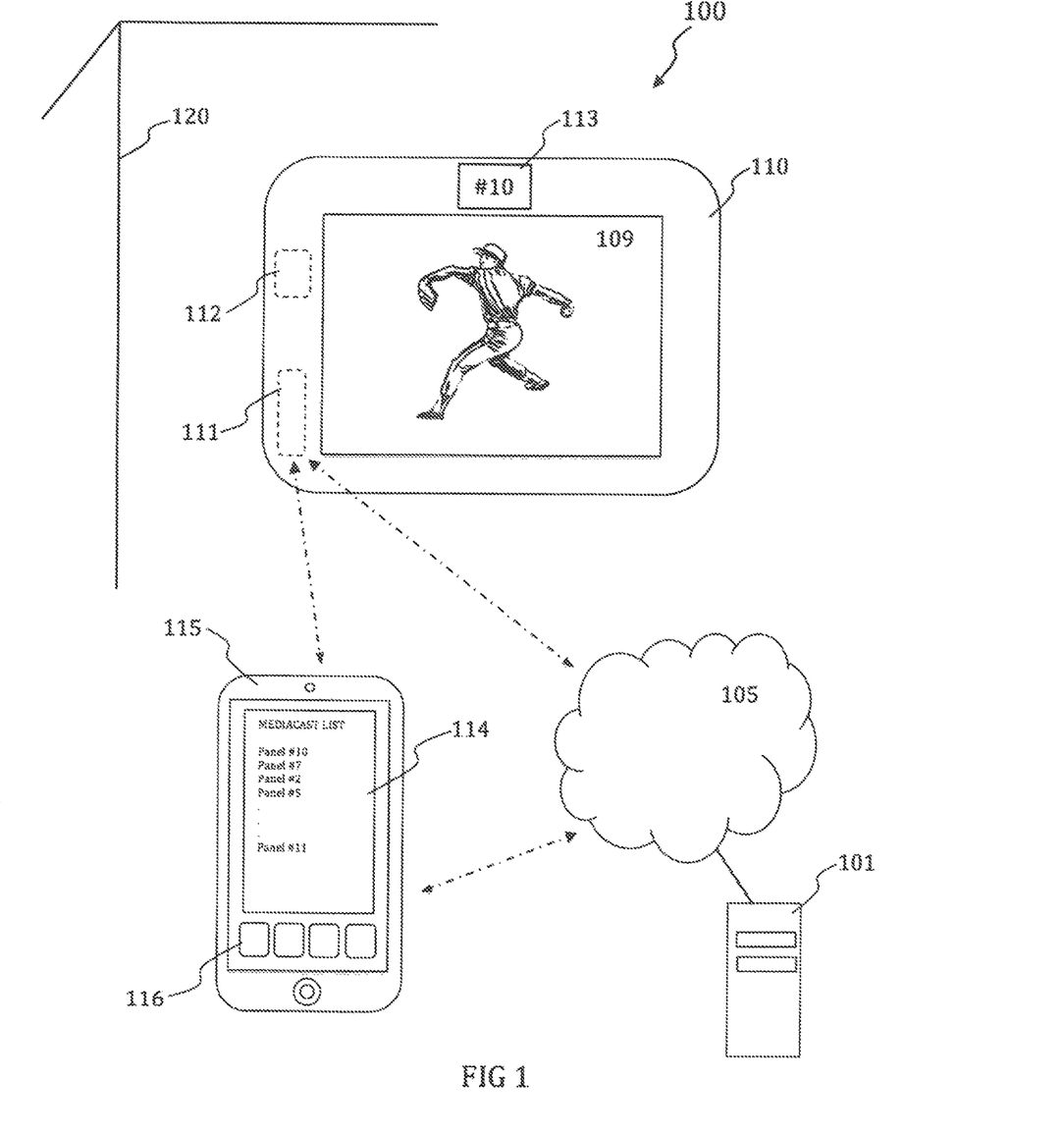
FIG. 1 illustrates a system enabling flat panel discovery and access to data associated with video programming displayed on a flat panel selected by a handheld device for use to retrieve associated data.

FIG. 1 illustrates system 100 enabling flat panel discovery and access to data associated with programming (e.g., a live video broadcast) displayed on a flat panel 110 selected by a handheld device 115. A flat panel 110 can have access to a data network 105 to retrieve programming and information from a remote server 101, either directly or via connectable devices 109 like Apple TV, Roku and set top boxes. The flat panel 110 can also have an internal (built-in) wireless communication module 111 (e.g., WiFi or Bluetooth, or both) to support communications with nearby handheld devices 115 or to obtain further data access from the network 105 in the same manner as a connected device like Apple TV or Roku would through application software. The flat panel device can include a memory 112 that can function as a queue to store programming displayed on a display screen (e.g., LCD, LED, Plasma, or the like) integrated in the flat panel. and which can include a limited amount of past programming previously displayed on the display screen 109 integrated in the flat panel. The wireless communication module can wirelessly broadcast identifying information 113 for the flat panel 110 to nearby handheld devices 115. The identifying information 113 can be any of an identification number (screen labeled #10, as shown) physically located on or near a flat panel 110 that can be read by spectators, or electronic information broadcasted about the physical location of the flat panel 110 in a venue 120, or broadcasted information about programming being displayed on the flat panel 110. The broadcast of wireless-enabled device identities is common for WiFi hotspots and Bluetooth connected devices, where identifying information is periodically sent for receipt by devices in search of a wireless data connection; however, flat panel television sets do not currently broadcast identifying information (in particular, after-market labels, or physical location information), and information broadcasted from other devices today are not used for purposes of obtaining data associated with programming displayed on flat panel displays where numerous other flat panel displays may also be co-located (located next to each other) in a crowded venue (e.g., a sports bar, casino or sports stadium).

Flat panels 110 enabled with a wireless communication module 111 and memory 112 can be programmed using a mediacasting application to broadcast identifying information rather than just the manufacturer and model information. Manufacturer and model information would be useless if broadcasted from, for example, ten flat panel devices in a sports bar that are made by the same manufacturer and are the same model. This is why the use of unique identifying information is necessary in accordance with some features of the present invention. Information will be described in further detail below, but can include physical location, programming information or a name/label physically attached to the flat panel to assist users in identification of the desired flat panel to interact with.

The handheld device 115 can be provided in the form of a smartphone (e.g., iPhone, Android-based smartphone) or tablet and include an application 116 that enables the discovery of available flat panels 110 near the handheld device 115 or identification of video programming being displayed on a selected flat panel. Discovery can be accomplished by receiving identifying information 113 for the flat panel in a list of available devices 114, or for the programming being rendered on the flat panel 100. The flat panel 110 can be selected on the handheld device 115, and the handheld device 115 can then begin receiving data associated with programming displayed at the flat panel 110. The handheld device 115 can also interact with programming displayed at the flat panel 110 via the application 116.

Figure 2:
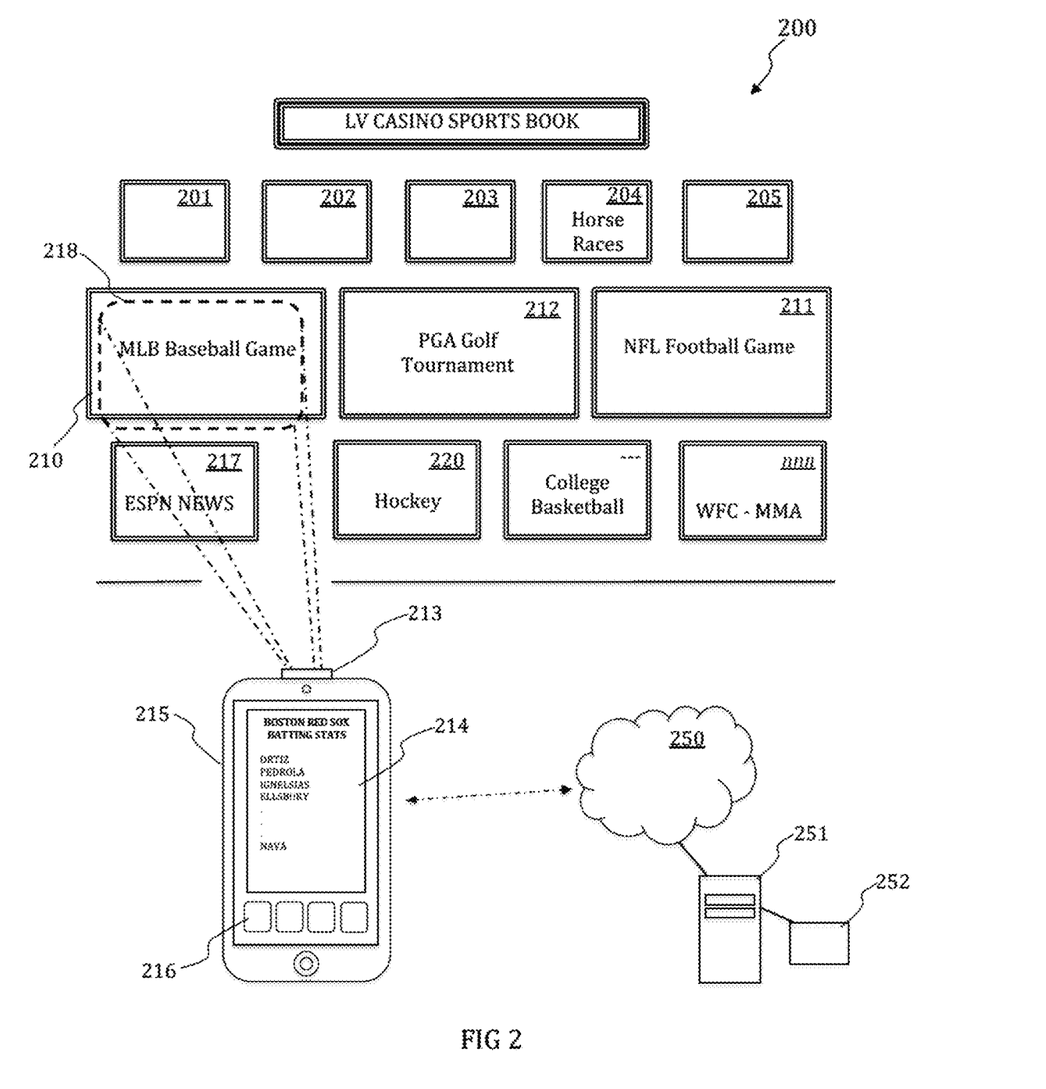
FIG. 2 illustrates a system enabling capture of an image of video programming from a select flat panel display, matching of the captured image with images of video programming (e.g., video broadcasts) stored in a remote server, determination of a match and the availability of related data, and enabling access to data associated with programming displayed on a particular flat panel selected by a handheld device, even when several flat panel devices are also located near the handheld device.

FIG. 2 illustrates a system 200 enabling identification of video programming rendering on a selected flat panel 210 in accordance with alternative features of the present invention. The system can enable handheld device 215 access to data related to the video programming from a remote server 251 based on the Identification of video programming rendering on the selected flat panel 210. Accordingly, an image of the video programming (e.g., image of a live MLB Baseball Game) can be captured by a camera 213 integrated in the handheld device 215. The image can then be transferred to a remote server 251 accessible by the handheld device 215 over a data network 250 (e.g., via WIFI or cellular data) wherein the captured image can be compared to images of video programming, which can be stored in a database 252 associated with or accessible by the remote server 251. If the image matches the images of video programming stored in the database 252, a notification message and/or indication of the availability of data associated with the video programming captured by the handheld device 215 from the selected flat panel 210 is sent to the handheld device 215. The handheld device 215 can capture the image from the selected flat panel 210 with the handheld device 215 despite the availability of several additional flat panel devices 201, 202, 212, and 217, in close proximity to selected flat panel 210 because only the image from the selected flat panel 210 is what is used for comparison at the server and for an indication of video programming related data availability. As shown on the display screen 214 of handheld device 215, the programming can be identified (e.g., "Boston Red Sox") once a match is determined. Available data can include video, replays, statistics, advertisement, etc., that can as also shown on display screen 214. The data can be managed with the touchscreen user interface of the handheld device 215, which is typically feature of modern smartphones and tablet computers together with wireless data network access and an integrated camera.

The ability to single out a specific flat panel and access data based on media rendering on the selected flat panel is another important features of the invention in settings where numerous screens might be present. Such a scenario would be common in a publicly accessible venue, such as a sports bar, sports venue, lobby or casino sports book where multiple flat panel displays rendering various programming are available. In this type of scenario, a software application can be opened on the handheld device 215 that will enable the handheld device 215 to capture images, compare images and identify matching video images for video programming being displayed on a select flat panel 210, and then obtain access to data that is associated with the matched video images and video programming. A user of the handheld device can then choose to capture an image from another flat panel device (e.g., flat panel 211, "NFL Football Game") if the user desires access to new data related to a different video program.

Flat panel identities can also be determined numerically and based on content. Numerical identification can first be physical (e.g., by a user reading a number marked on the housing of a flat panel) and then electronic, based on information obtained physically. Identification can also be based on physical location information (e.g., "60 inch Sony-above cash register-over bar"). Identification can also be based on programming (e.g., "LA Lakers", "Dodgers" or "HDTV"). It is entirely possible that the same programming of interest will be displayed on multiple flat panels located at the same venue. It this case, any of the flat panels 212 displaying the same programming of interest can be selected for data retrieval by, and/or interaction with, the handheld device 215.

Once common programming information of interest is identified (i.e., the same football game, regardless of the flat panel used to identify it), the handheld device 215 can selectively retrieve programming related data from either the selected flat panel or a remote server 251 via a wireless data network given the teaching provided herein.

Figure 3:
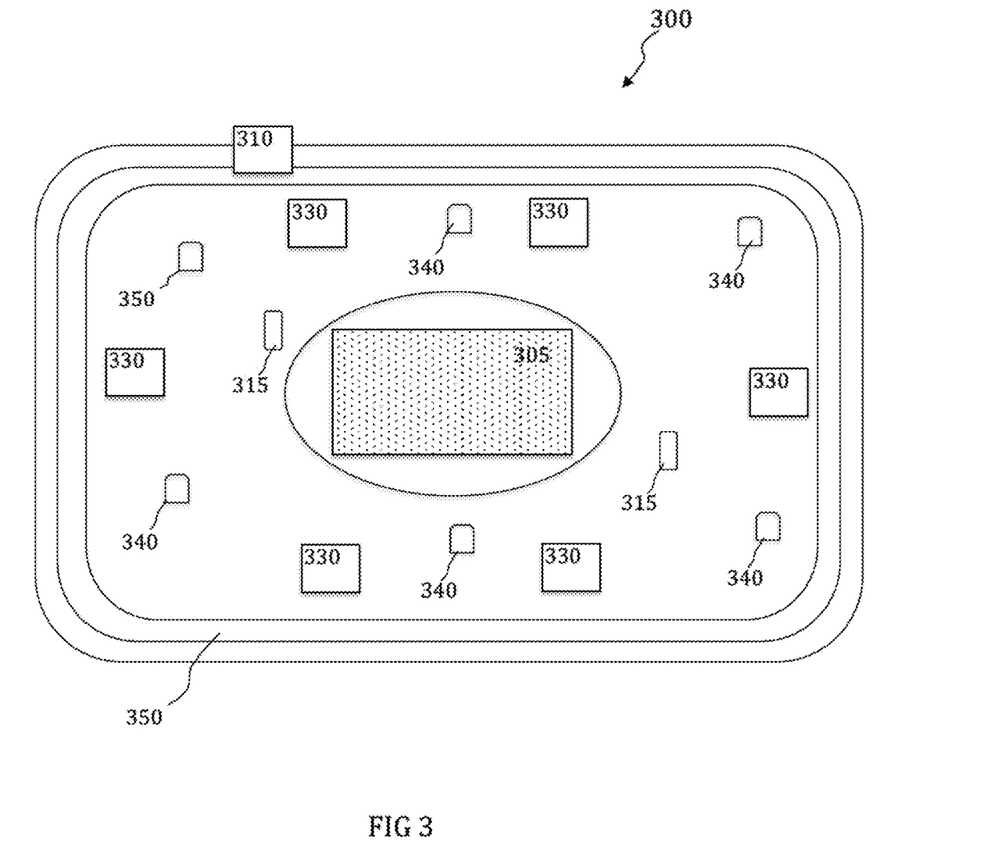
FIG. 3 illustrates a system deployed in a large venue such as a sports stadium that utilizes wireless infrastructure at the venue to broadcast available data associated with video programming being displayed on flat panel displays located throughout the large venue and can also enable access to the data associated with the video programming displayed on a particular flat panel.

FIG. 3 illustrates a system 300 deployed in a large venue 350 such as a sports stadium that utilizes wireless infrastructure including hotspots 340 at the venue to broadcast available data associated with programming being displayed on flat panel displays 330 located throughout common areas of the large venue to handheld devices 315 also located at the venue 350, and can also enable access to the data associated with programming displayed on a particular flat panel 310 (e.g., flat panels deployed in a private suite location) selected by handheld devices 315 when several flat panel devices are also located near the handheld device in accordance with features of the present invention. Wireless infrastructure can include hotspots deployed throughout the large venue. U.S. Pat. No. 8,320,820 issued to Ortiz, co-inventor of the present invention, entitled "Self-contained data communication system nodes as stand-alone pods or embedded in concrete walkways and in walls at public venues including sports and entertainment venues" describes hotspots deployed in a sports venue to enable handheld device access to venue-related data. U.S. Pat. No. 8,320,820, which can be utilized to implement certain novel features of the present invention, is hereby incorporated by reference in its entirety for its teaching. The hotspot pods described by Ortiz can be adapted with mediacasting capabilities as described herein to provide handheld devices users with a list of data related to programming being displayed on flat panels in the venue that is available for retrieval by the handheld devices, or the availability of interaction with the programming that is being displayed. With the present invention, the skilled can imagine a multi-participant interactive session (e.g., gaming, social networking) that is directly associated with programming being displayed on flat panels located at the venue.

In accordance with features of the present invention, a system deployed in a sports stadium 350 can enable sports fans using smartphones 315 to recognize and interact with media being displayed at the venue to retrieve instant replays, statistics, and other data based on programming being viewed on numerous flat panel displays 330 typically located within such a venue 350. A football fan, for example, can re-watch an instant replay for a programming he just viewed on a flat panel display 310 located near his seat, a baseball fan can review additional facts statistics for an athlete shown on a flat panel 310 that is currently at bat. The invention benefits all sports (basketball, soccer, ice hockey, tennis) so long as flat panel displays 330 exist in the venue and are displaying active programming to attendees. Programming information can also be used by the handheld device 315 to retrieve additional information from a remote server as previously described.

Figure 4:
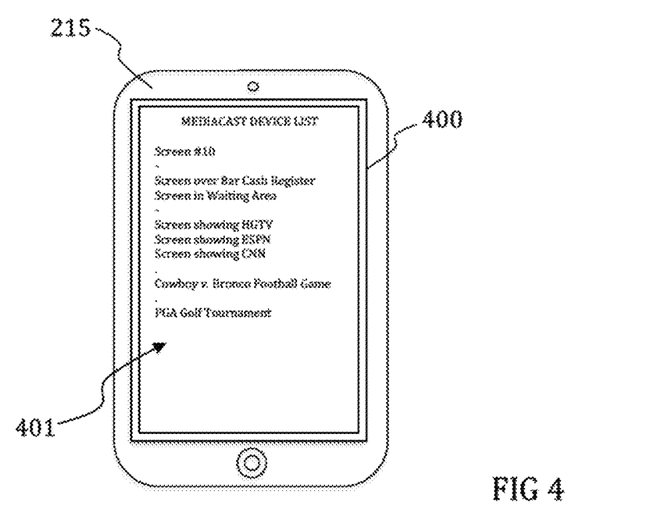
FIG. 4 illustrates a screen shot from a handheld device illustrating a list of flat panels wirelessly discovered for access to data therefrom.
Figure 5:
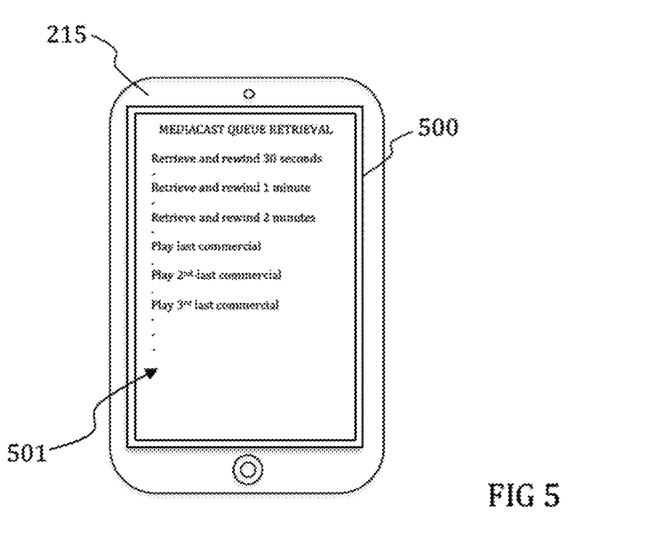
FIG. 5 illustrates a screen shot from a handheld device illustrating a list of programming accessible from a queue (memory) in a remote server and/or associated with a flat panel selected by the handheld device.

FIG. 4 illustrates a screen shot 400 from a handheld device 215 illustrating a menu-like list 401 of flat panels that were wirelessly discovered by the handheld device 215 for access to data therefrom. A handheld device user can select a flat panel from a list based on the handheld device user's programming of interest. Once selected, the handheld device 215 will be engaged in a data retrieval and/or interaction session. Data can be retrieved based on real-time programming that is being displayed on a flat panel, or for programming that was recently displayed but has now passed (e.g., a commercial that has already passed, an instant replay of a live sports game, or statistical information about an athlete). Referring to FIG. 5, a screen shot 500 is shown from a handheld device 215 that can provide a list of past programming 501 accessible from a queue (flat panel or set top box memory, or remote server) associated with recognized video programming or a selected flat panel that can still be selected and data retrieved by the handheld device. This aspect of the invention is of high value in sports media where fast moving games can cause a sports fan to miss an important play or statistical information about an athlete or team that has already passed the screen. A user can be provided with limited access to past programming from a queue associated with the flat panel device; however, a menu of past programming as described with respect to FIG. 5 will simplify access to desired information by users. The listing can be provided in the form of time (e.g., "rewind 30 seconds", "rewind 1 minute", "rewind 2 minutes") or based on identifying information (e.g., "last commercial", "$2^{nd}$-last commercial"; "$3^{rd}$ last commercial"). Alternatively, the content can be displayed as recorded video with a scroll bar that can include "pause", "play", "forward", and "rewind" capabilities, similar to that provided for reviewing YouTube videos. The display of stored video content previously displayed by the flat panel and stored in the queue can also be enhanced with image tiles that pop up as the user moves along the scroll bar to help the user focus in on images for the video location that the user wants to review from the queue. Once the proper content is identified, the user can access data associated with the past programming/content.

In accordance with features of the present invention, a system deployed in a sports stadium can enable sports fans using smartphones to interact with media being displayed at the venue to retrieve instant replays, statistics, and other data based on programming being viewed on numerous flat panel displays typically located within such a venue. A football fan, for example, can re-watch an instant replay for a programming he just viewed on a flat panel display located near his seat, a baseball fan can review additional facts statistics for an athlete shown on a flat panel that is currently at bat. The invention benefits all sports (basketball, soccer, ice hockey, tennis) so long as flat panel displays exist in the venue with the present invention capabilities and are displaying active programming to attendees. Programming information can be used by the handheld device to retrieve additional information from a remote server as previously described.

Figure 6:
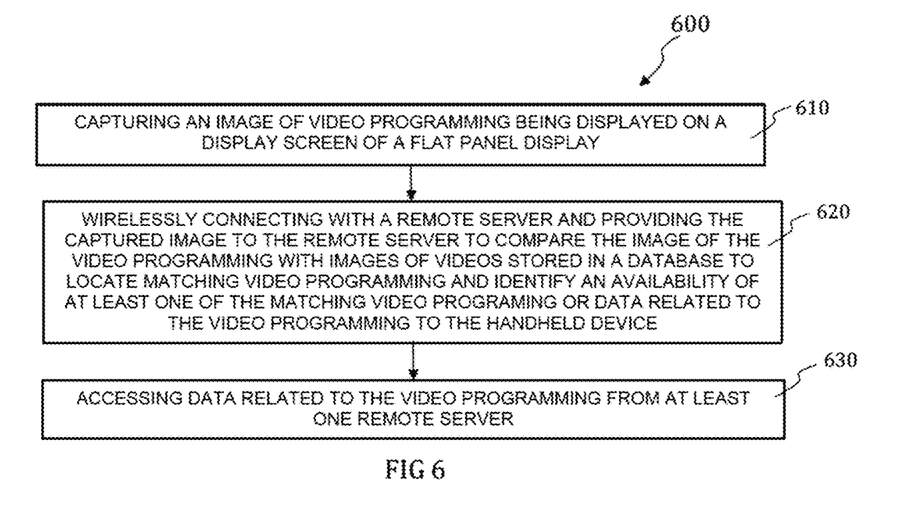
FIG. 6 illustrates a block diagram of steps that can be followed for discovering a flat panel with a handheld device and accessing data associated with programming displayed on the flat panel.

FIG. 6 illustrates a block diagram 600 of steps for identifying video programming rendering on a flat panel and accessing data related to the video programming from a remote server. As shown in block 610, a handheld device can capture an image of video programming being displayed on a display screen of a flat panel display. In block 620, the handheld device connects with a remote server via a data network and provides the captured image to the remote server where the remote server compares the image of the video programming with images of videos stored in a database in the remote server to locate matching video programming and identify an availability of the matching video programming or data related to the video programming to the handheld device. Then as shown in Block 630, the handheld device obtains access to at least one of the matching data or data related to the video programming from at least one remote server. The reason at least one remote server is indicated is because the system or server may locate servers other than the original server contacted to analyze the captured image that are in closer proximity to the handheld device, thereby enhancing video streaming quality and reducing delay. Access to data from remote servers can also depend on location of the handheld device 215, based on any of GPS or network access (e.g., IP router Address, cell tower identification, signal triangulation) because knowing the handheld device's location can enable the notifying remote server to help with the location servers in closer proximity to handheld device 215 in order to help reduce network delay and improve video data streaming quality. Alternate servers can also be purposely selected by a user or be based on a user profile (e.g., a profile set up in the App or registered in a user account or device) because of language requirements (e.g., the need for audio and text in Spanish or French, instead of English). User profile information can also include pre-registered account information for purposes of selected a server to access data. The user may already be registered with a particular service (e.g., a paid cable, satellite or subscription media account) from which the user prefers to retrieve content related to the match, if such media is available via servers associated with the preregistered account.

An application can enable the scanning of video programming rendering on the flat panel by the handheld device 215 by assuring that the camera 213 captures an entire screen of the flat panel within a scan window displayed on the handheld device display. This can assure media match accuracy. Additionally, scan quality can be enhanced at closer distances to a video monitor screen and by preventing large angles with respect to the mobile devices location in front of the video monitor. Notice that the handheld device 215 in FIG. 2 is slightly offset to the right of flat panel 210, which could affect capture quality and can be corrected by moving slightly to the left for a straight-on image capture.

Figure 7:
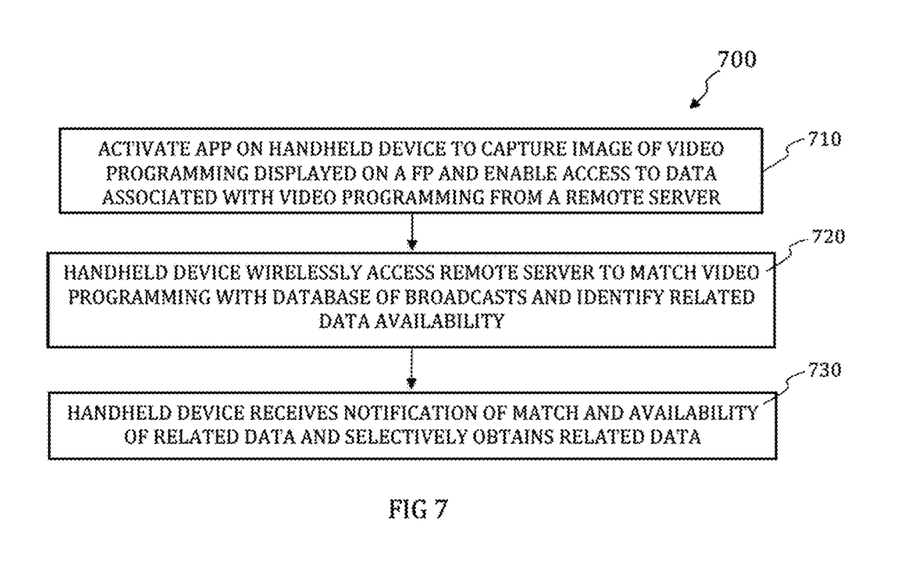
FIG. 7 illustrates a block diagram of steps that can be followed for enabling discovery of a video programming rendering on a flat panel device by handheld devices and for providing data associated with programming displayed on the flat panel to handheld devices.

FIG. 7 illustrates a block diagram 700 of steps enabling discovery of a flat panel device by handheld devices and for providing data associated with programming displayed on the flat panel to handheld devices. As shown in Block 710, an APP on a handheld device is activated to capture image of video programming displayed on a flat panel display and enable access to data associated with video programming from a remote server. The handheld device then wirelessly accesses a remote server to match video programming with database of broadcasts and identify related data availability, as shown in Block 720. Then as shown in block 730, the handheld device receives notification of match and availability of related data and selectively obtains related data. The information can include data (e.g., video, statistics, video replays, etc.), but the handheld device can use identity information obtained from the flat panel video programming match to then access additional data associated with the programming being displayed on the selected flat panel display from servers.

Figure 8:
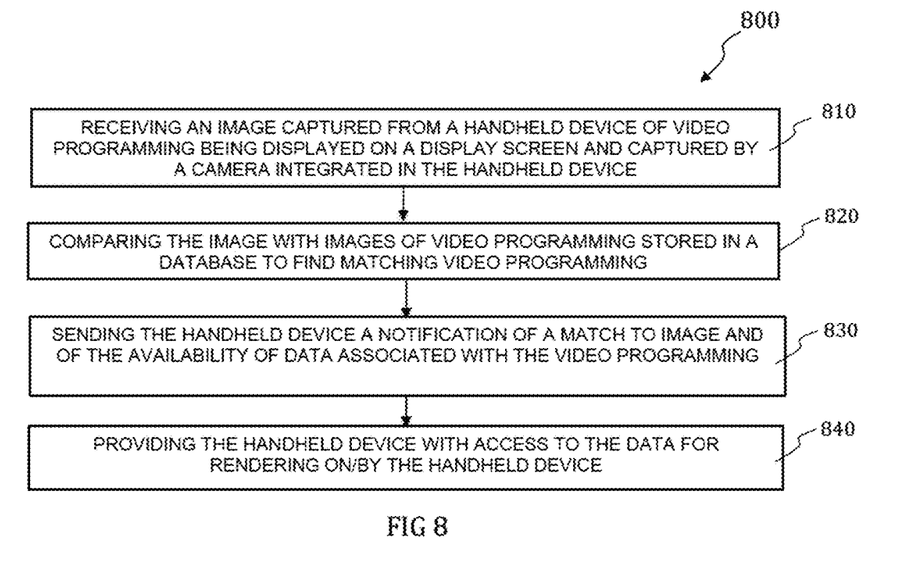
FIG. 8 illustrates a block diagram of steps enabling identification of video programming rendering on a flat panel device by handheld devices and for providing the handheld devices with access to data associated with video programming displayed on the flat panel.

FIG. 8 illustrates a block diagram 800 of steps of using a remote server to assist a handheld device that has captured an image of video programming of interest rendering on a flat panel display to access data including video related to the video programming being displayed on the flat panel display based on the capture image. As shown in block 810, a remote server receives an image from a handheld device of video programming being display on a display screen and captured by a camera integrated in the handheld device. The remote server then compares the image with images of video programming stored in a database to find matching video programming, as shown in block 828. The remote server can send the handheld device notification of a match to the image and can also indicate the availability of data associated with the video programming, as shown in block 830. The remote server can them provide the handheld device with access to the data for rendering on/by the handheld device, as shown in block 840. The access can be from the same remote server, or from other servers for reason indicated above (location to enhance quality, or user profile requirements).

It should be appreciated that handheld devices can be pre-registered and/or pre-authorized to access the remote server or servers to employ the services taught herein. Registration can require any of: user identity, contact/address information, demographics, setting up a username, setting up a password, occupation, areas of interest, and payment of a fee. Registered user can then be recognized by a server based on device identification or upon logging into the server.

It should also be appreciated that advertising data (e.g., in the form of text ads or short video commercials) can be provided to handheld devices obtaining data including video that is of interest (related to the video programming displayed on a flat panel) prior to, or after, receiving the data including video. Advertising data can support a revenue model for a service embodying the features of the present invention so that the service can be provided free of charge to end users rather than collecting user fees.

It should be appreciated from the foregoing disclosure that the methods and systems described herein can be utilized in various environments including private offices or living rooms and public venues such as sports bars, casinos, sports stadiums, shopping centers, amusement parks, transportation terminals, educational institutions, and others public and private locations.

The invention claimed is:

1. A remote server comprising applications accessible by handheld devices for execution to conduct methods of video programming recognition and access to data associated with recognized video programming, said data stored in and accessible from said remote server and a plurality of other servers by the handheld device and including video replays, statistics, audio in more than one language. and text in more than one language, said remote server configured to carry out steps comprising:

receiving an image captured from a handheld device of at least one of live and recorded video programming being displayed on a display screen comprised of a flat panel display and captured by a camera integrated in the handheld device, wherein the display screen is located amongst other flat panels displays within a publicly accessible venue and enables access by handheld devices to data associated with programming of interest to users of the handheld devices that is rendering on a select flat panel display located within the publicly accessible venue;

comparing the image with images of recorded video programming stored in a database to find data matching the video programming;

sending the handheld device a notification of a match to the image and of the availability of data including video replays, statistics, audio in more than one language, and text in more than one language, associated with the video programming;

providing the handheld device with access to the data for rendering by the handheld device based on at least one of the handheld device location, registration of the handheld device, or a user profile, wherein the data includes: past video programming displayed on the display screen and limited to selectable segments of video limited to past video programming displayed on the display screen before the point or spot that the image is captured, statistics, audio in more than one language, and text in more than one language; and enabling retrieval of data related to the programming displaying on a particular flat panel display with programming of interest by the handheld devices via the capturing an image of the programming as it is being rendered on the particular flat panel;

wherein enabling retrieval of the data related to the programming displaying on a particular flat panel display with programming of interest by the handheld devices via the capturing of an image occurs upon activation of an application on the handheld device to capture the image of at least one of live and recorded video programming being displayed on a display screen utilizing the camera integrated in the handheld device and wirelessly access the remote server for the matching of the captured image and to access data associated with the video programming based on a match with at least one image at the remote server: and wherein retrieval is conducted from the remote server without disturbing or changing the programming as it is being displayed on the particular flat panel display or the flat panel displays as further perceived by spectators observing programming rendering thereon.

2. The server of claim 1, wherein the data is stored in and accessible from the remote server by the handheld device if the handheld device is registered and authorized to access data by the remote server.

3. The server of claim 1, wherein the data includes statistics associated with sports broadcasting as the video programming.

4. The server of claim 1, wherein the data is stored in and accessible from a particular remote server based on a user profile.

5. The server of claim 1, wherein the data is stored in and accessible from at least one remote server in addition to the remote server based on location of the handheld device.

* * * * *